United States Patent
Zambelli Hosmer et al.

(10) Patent No.: US 10,929,830 B2
(45) Date of Patent: Feb. 23, 2021

(54) SYSTEMS AND METHODS TO PROVIDE CHECK-IN BASED PAYMENT PROCESSES

(75) Inventors: Federico Zambelli Hosmer, Bologna (IT); Julij Vanello Premru, Trieste (IT); Pietro Sardo, Cernusco sul Naviglio (IT)

(73) Assignee: PayPal, Inc., San Jose, CA (US)

( * ) Notice: Subject to any disclaimer, the term of this patent is extended or adjusted under 35 U.S.C. 154(b) by 578 days.

(21) Appl. No.: 13/614,429

(22) Filed: Sep. 13, 2012

(65) Prior Publication Data

US 2013/0198076 A1 Aug. 1, 2013

Related U.S. Application Data

(60) Provisional application No. 61/592,254, filed on Jan. 30, 2012.

(51) Int. Cl.
| | | |
|---|---|---|
| *G06Q 20/32* | (2012.01) | |
| *G06Q 20/12* | (2012.01) | |
| *G06Q 20/38* | (2012.01) | |
| *G06Q 20/40* | (2012.01) | |

(52) U.S. Cl.
CPC .......... *G06Q 20/322* (2013.01); *G06Q 20/12* (2013.01); *G06Q 20/385* (2013.01); *G06Q 20/4012* (2013.01)

(58) Field of Classification Search
CPC ........ G06Q 30/00; G06Q 20/00; G06F 17/60; G06F 15/16
USPC .............. 705/26.39, 41, 26.8, 44, 71, 14.23
See application file for complete search history.

(56) References Cited

U.S. PATENT DOCUMENTS

| | | | | |
|---|---|---|---|---|
| 7,496,527 B2 * | 2/2009 | Silverstein | ............. | G06Q 20/04 705/26.8 |
| 7,810,720 B2 | 10/2010 | Lovett | | |
| 8,583,511 B2 * | 11/2013 | Hendrickson | .......... | G06Q 30/02 701/2 |
| 2003/0028481 A1 * | 2/2003 | Flitcroft | ................. | G06Q 20/00 705/39 |

(Continued)

FOREIGN PATENT DOCUMENTS

| | | |
|---|---|---|
| AU | 2012368266 | 10/2015 |
| AU | 2016200122 | 1/2016 |

(Continued)

OTHER PUBLICATIONS

"International Application Serial No. PCT/US2012/055195, International Preliminary Report on Patentability dated Aug. 14, 2014", 5 pgs.

(Continued)

*Primary Examiner* — Calvin L Hewitt, II
*Assistant Examiner* — Nakia Leffall-Allen

(57) ABSTRACT

Systems and methods for providing check-in based payment processing are discussed. In an example, a method for check-in based payment processing can include receiving check-in data, generating a pre-approval, sending a one-time-use PIN, receiving a validated transaction, and processing a payment. The check-in data can include a merchant identifier and user information identifying a user registered with the check-in service and associated with a mobile device. The pre-approval can include a one-time-user PIN. The validated transaction can include the one-time-user PIN associated with the pre-approval.

18 Claims, 9 Drawing Sheets

(56) References Cited

U.S. PATENT DOCUMENTS

| | | |
|---|---|---|
| 2003/0233276 A1 | 12/2003 | Pearlman et al. |
| 2006/0253389 A1 | 11/2006 | Hagale et al. |
| 2007/0052517 A1* | 3/2007 | Bishop .................. G06Q 20/10 340/5.2 |
| 2010/0145861 A1* | 6/2010 | Law ..................... G06Q 20/102 705/76 |
| 2011/0089233 A1 | 4/2011 | Locher |
| 2011/0093351 A1 | 4/2011 | Afana |
| 2011/0153496 A1* | 6/2011 | Royyuru ................ G06Q 20/12 705/44 |
| 2011/0184866 A1 | 7/2011 | Shakkarwar |
| 2011/0238473 A1 | 9/2011 | Sankolli et al. |
| 2012/0006891 A1 | 1/2012 | Zhou et al. |
| 2012/0047071 A1* | 2/2012 | Mullen et al. .................. 705/44 |
| 2012/0084177 A1* | 4/2012 | Tanaka ............... G06Q 30/0613 705/26.41 |
| 2012/0239479 A1* | 9/2012 | Amaro ................ G06Q 20/102 705/14.23 |

FOREIGN PATENT DOCUMENTS

| | | |
|---|---|---|
| AU | 2018203859 | 6/2018 |
| CA | 2861489 | 5/2017 |
| DE | 212012000252 | 9/2014 |
| DE | 112012005778 T5 | 10/2014 |
| KR | 1020030007296 A | 1/2003 |
| KR | 1020110124462 A | 11/2011 |
| WO | WO-2013115853 A1 | 8/2013 |

OTHER PUBLICATIONS

"International Application Serial No. PCT/US2012/055195, International Search Report dated Dec. 7, 2012", 4 pgs.

"International Application Serial No. PCT/US2012/055195, International Written Opinion dated Dec. 7, 2012", 3 pgs.

"Australian Application Serial No. 2012368266, Office Action dated Apr. 10, 2015", 3 pgs.

"Australian Application Serial No. 2012368266, Response filed Aug. 24, 2015 to Office Action dated Apr. 10, 2015", 20 pgs.

"Canadian Application Serial No. 2,861,489, Office Action dated Jul. 27, 2015", 5 pgs.

"Korean Application Serial No. 2014-7021374, Office Action dated Feb. 12, 2016", with English translation of claims, 9 pgs.

* cited by examiner

SYSTEMS AND METHODS TO PROVIDE CHECK-IN BASED PAYMENT PROCESSES

CROSS-REFERENCE TO RELATED APPLICATION

This application claims the benefit of U.S. Provisional Application No. 61/592,254, titled "Systems and Methods to Provide Check-in Based Payment Processes," filed Jan. 30, 2012, which is incorporated herein by reference in its entirety.

TECHNICAL FIELD

This application relates generally to data processing within a network-based system operating over a distributed network, and more specifically to systems and methods to provide check-in based payment processes, which allow a user to pre-authorize a transaction by registering a check-in at a location.

BACKGROUND

The ever increasing use of smart phones, such as the iPhone® (from Apple, Inc. of Cupertino Calif.), with data connections and location determination capabilities is slowly changing the way people shop and pay for products both online and at local retailers. Smart phones can provide users with nearly instant information regarding pricing and deals. Smart phones are also being targeted to replace a person's wallet and enable flexible convenience payment mechanisms.

BRIEF DESCRIPTION OF THE DRAWINGS

Some embodiments are illustrated by way of example and not limitation in the figures of the accompanying drawings in which.

DEFINITIONS

Figure 1:
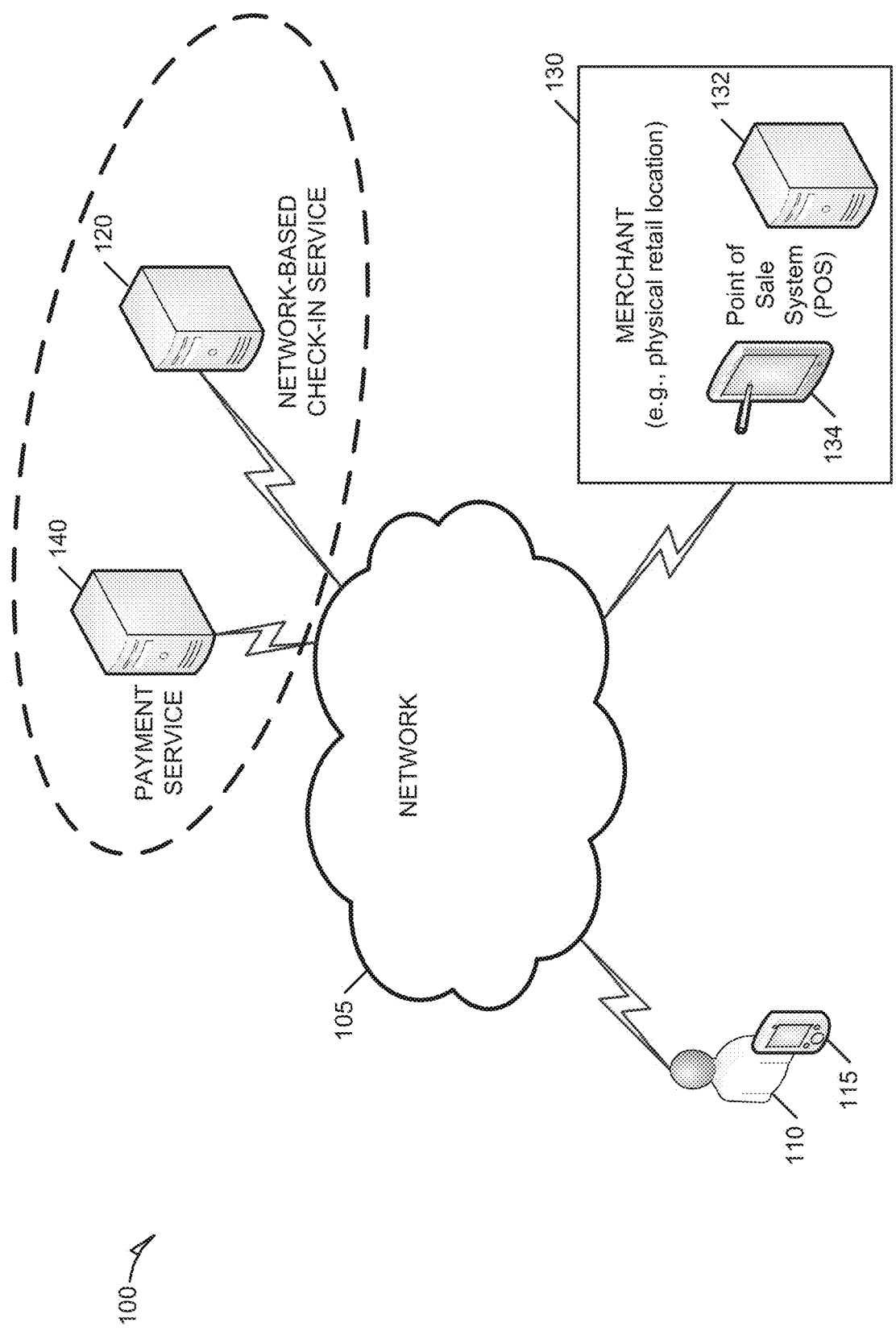
FIG. 1 is a block diagram depicting a system for delivering check-in based payment processes, according to an example embodiment.

Location—For the purposes of this specification and the associated claims, the term "location" is used to refer to a geographic location, such as a longitude/latitude combination or a street address. The term location is also used within this specification in reference to a physical location associated with a retail outlet (e.g., store).

Real-time—For the purposes of this specification and the associated claims, the term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

DETAILED DESCRIPTION

Example systems and methods for enabling check-in based payment processes are described. In some example embodiments, the systems and methods for enabling check-in based payment processing allow a user to pre-authorize and pay via a check-in on a mobile device. In an example, the FOURSQUARE™ check-in service can be coupled to a payment service to enable payments via a mobile device. In the following description, for purposes of explanation, numerous specific details are set forth in order to provide a thorough understanding of example embodiments. It will be evident, however, to one skilled in the art that the present invention may be practiced without these specific details. It will also be evident that a check-in based payment system is not limited to the examples provided and may include other scenarios not specifically discussed.

In accordance with an example embodiment, a network-based system can provide a platform to provide both a check-in service and payment capabilities. In certain examples, the check-in service and the payment service can be provided by separate systems. In some examples, the user interacts with a network-based system (e.g., check-in service and/or payment service) via a mobile device, such as a smartphone, a tablet computing device, or an Internet enabled personal digital assistant (PDA), among others. In an example, the network-based system can include a publication module capable of delivering check-in based offers to a user based on stored user profile data and local merchant campaigns. In certain examples, selecting a check-in based offer can initiate the payment process.

In an example, a check-in can be used to initiate a mobile payment process via a mobile device. In this example, a check-in service, such as FOURSQUARE, can work in cooperation with an online or mobile payment processing service, such as PAYPAL, to provide a check-in based mobile payment system. In such as system, a merchant can authorize the payments system to use data from its check-in account (e.g., check-ins, offers, user names, etc. . . . ) to power payments and improve sales insights. In an example, a merchant can visit a web portal provided by the payments system to pair a check-in account with their payment account. Linking these accounts can enable the payments system to interact with users that check-in at one of the merchant's physical locations via the check-in service.

The check-in service, or in some examples the payments system, can allow the merchant to create offers or deals for distribution to users of the check-in or payments system. The deals can be used to attract new customers or reward existing customers, among other things.

In certain examples, a user can link a personal account on the payments system with an account on the check-in service. In some examples, the user can create a new payments system account via the check-in service or vice-versa. Once the accounts are linked, the user can start receiving offers when checking in at various physical locations. The payments system can also allow for streamlined payment processing via a user's mobile device using a check-in as a pre-authorization to start the payment process with a merchant.

In an example, the pre-authorization generated by the user's check-in expires after a certain length of time or upon a termination event. A termination event can include a check-in at a different physical location, among other things. Pre-authorization can include a one-time use PIN that is communicated to the user's mobile device for use in completing a transaction with the merchant.

Once a check-in has occurred, the payments system can send a notification to the merchant that a new customer has checked in. In certain examples, the payments system can send notification to the merchant's point of sale (POS) system. In an example, the notification can include information about the user, such as a picture, that enables identification and interaction with the user.

When the user is ready to complete a transaction with the merchant, such as purchasing an offer sent as part of the check-in response, the user can enter the pre-authorization PIN into the merchant's POS as part of the process. The merchant's POS can use the PIN in communications with the payments system to uniquely identify the user and complete transaction processing. In some examples, the user can manually enter the PIN or verbally provide the PIN to the merchant. In other examples, the PIN can be communicating wirelessly to the merchant, such as to the merchant's POS system. Upon completing a transaction the payments system can send electronic receipts to both the merchant and the user.

Example System

FIG. 1 is a block diagram depicting a system for delivering check-in based payment processes, according to an example embodiment. The system 100 can include a user 110, a network-based check-in system 120, a merchant 130, and a network-based payment service 140. In an example, the user 110 can connect to the network-based check-in system 120 via a mobile device 115 (e.g., smart phone, PDA, laptop, or similar mobile electronic device capable of some form of data connectivity). In an example, the merchant 130 can operate computer systems, such as an inventory system 132 or a point of sale (POS) system 134, among others. The network-based check-in system 120 can interact with any of the systems used by merchant 130 for operation of the merchant's retail or service business. In an example, the network-based check-in system 120 can work with both the POS system 134 and inventory system 132 to obtain access to inventory available at individual retail locations run by the merchant and match merchandise on which the merchant wants to offer deals via the network-based check-in service 120. Additionally, the network-based payment service 140 can also interact with the merchant 130 via the POS system 134, enabling the merchant 140 to provide payment services offered by the network-based payment service 140. In certain examples, the payment server 140 and the network-based check-in service can be combined into a single service.

Example Operating Environment

Figure 2:
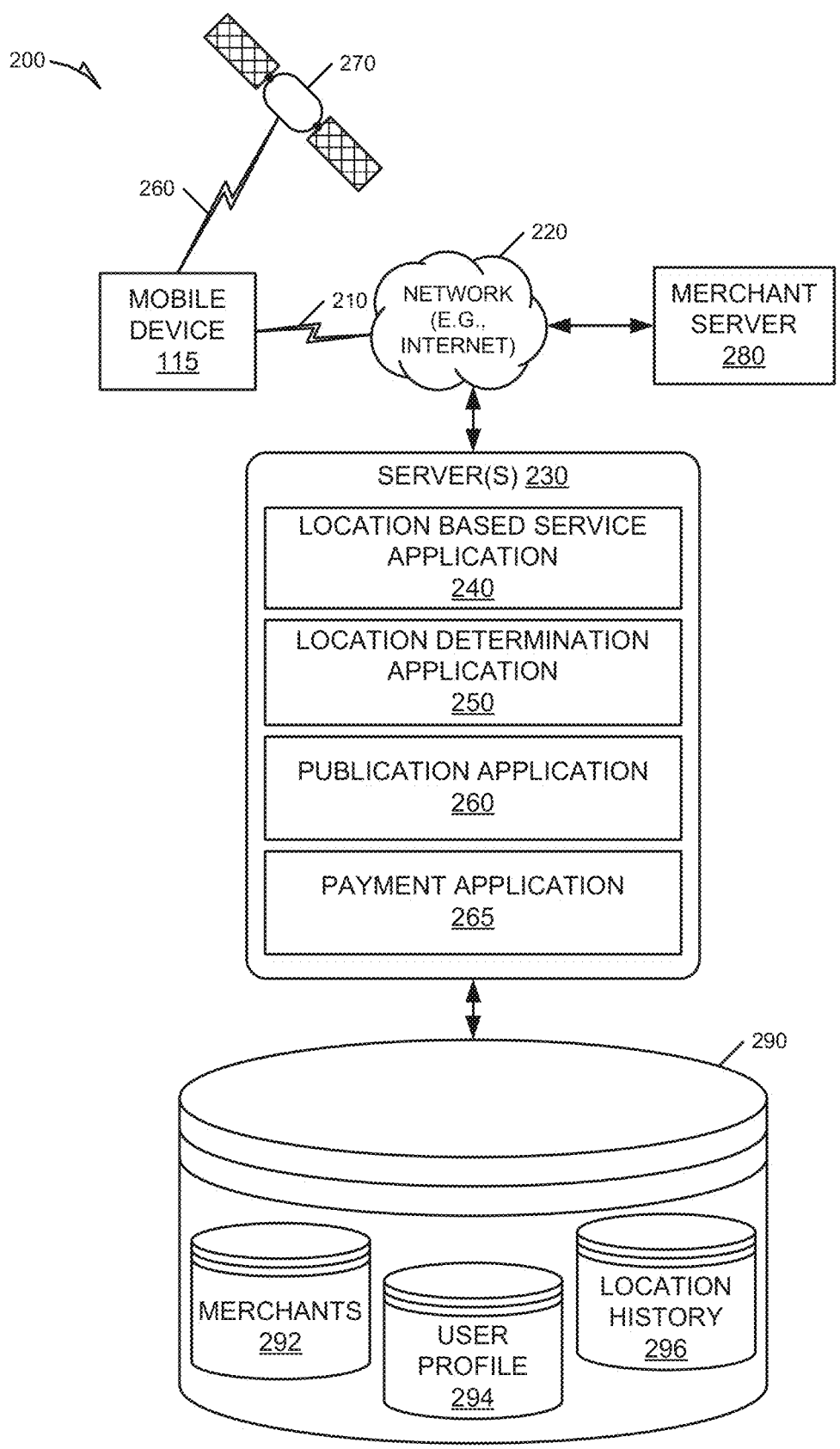
FIG. 2 is a block diagram illustrating an environment for operating a mobile device, according to an example embodiment.

FIG. 2 is a block diagram illustrating an environment for operating a mobile device, according to an example embodiment. The environment 200 is an example environment within which methods of check-in based payment process can occur. The environment 200 can include a mobile device 115, a communication connection 210, a network 220, servers 230, a communication satellite 270, a merchant server 280, and a database 290. The servers 230 can optionally include location based service application 240, location determination application 250, publication application 260, and payment application 265. The database 290 can optionally include merchant databases 292, user profile database 294, and/or location history database 296. The mobile device 115 represents one example device that can be utilized by a user to receive offers and process payments. The mobile device 115 may be any of a variety of types of devices (for example, a cellular telephone, a personal digital assistant (PDA), a Personal Navigation Device (PND), a handheld computer, a tablet computer, a notebook computer, or other type of movable device). The mobile device 115 may interface via a connection 210 with a communication network 220. Depending on the form of the mobile device 115, any of a variety of types of connections 210 and communication networks 220 may be used.

For example, the connection 210 may be Code Division Multiple Access (CDMA) connection, a Global System for Mobile communications (GSM) connection, or other type of cellular connection. Such connection 210 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 220 may include a cellular network that has a plurality of cell sites of overlapping geographic coverage, interconnected by cellular telephone exchanges. These cellular telephone exchanges may be coupled to a network backbone (for example, the public switched telephone network (PSTN), a packet-switched data network, or to other types of networks).

In another example, the connection 210 may be Wireless Fidelity (Wi-Fi, IEEE 802.11x type) connection, a Worldwide Interoperability for Microwave Access (WiMAX) connection, or another type of wireless data connection. In such an embodiment, the communication network 220 may include one or more wireless access points coupled to a local area network (LAN), a wide area network (WAN), the Internet, or other packet-switched data network.

In yet another example, the connection 210 may be a wired connection, for example an Ethernet link, and the communication network may be a LAN, a WAN, the Internet, or other packet-switched data network. Accordingly, a variety of different configurations are expressly contemplated.

A plurality of servers 230 may be coupled via interfaces to the communication network 220, for example, via wired or wireless interfaces. These servers 230 may be configured to provide various types of services to the mobile device 115. For example, one or more servers 230 may execute location based service (LBS) applications 240, which interoperate with software executing on the mobile device 115, to provide LBSs to a user. LBSs can use knowledge of the device's location, and/or the location of other devices, to provide location-specific information, recommendations, notifications, interactive capabilities, and/or other functionality to a user. For example, an LBS application 240 can provide location data to a network-based check-in system 120, which can then be used to assist in generating offers relevant to the user's current location and enable payment via the network-based payment system 140. Knowledge of the device's location, and/or the location of other devices, may be obtained through interoperation of the mobile device 115 with a location determination application 250 executing on one or more of the servers 230. Location information may also be provided by the mobile device 115, without use of a location determination application, such as application 250. In certain examples, the mobile device 115 may have some limited location determination capabilities that are augmented by the location determination application 250. In some examples, the servers 230 can also include publication application 260 for providing location-aware offers that may be triggered by present or past check-ins with the network-based check-in service 120. In certain examples, location data can be provided to the publication application 260 by the location determination application 250. In some examples, the location data provided by the location determination application 250 can include merchant information (e.g., identification of a retail location). In certain examples, the location determination application 250 can receive signals via the network 220 to further identify a location. For example, a merchant may broadcast a specific IEEE 802.11 service set identifier (SSID) that can be interpreted by the location determination application 250 to identify a particular retail location. In another example, the merchant may broadcast an identification signal via radio-frequency identification (RFID), near-field communication (NFC), or a similar protocol that can be used by the location determination application 250.

Example Mobile Device

Figure 3:
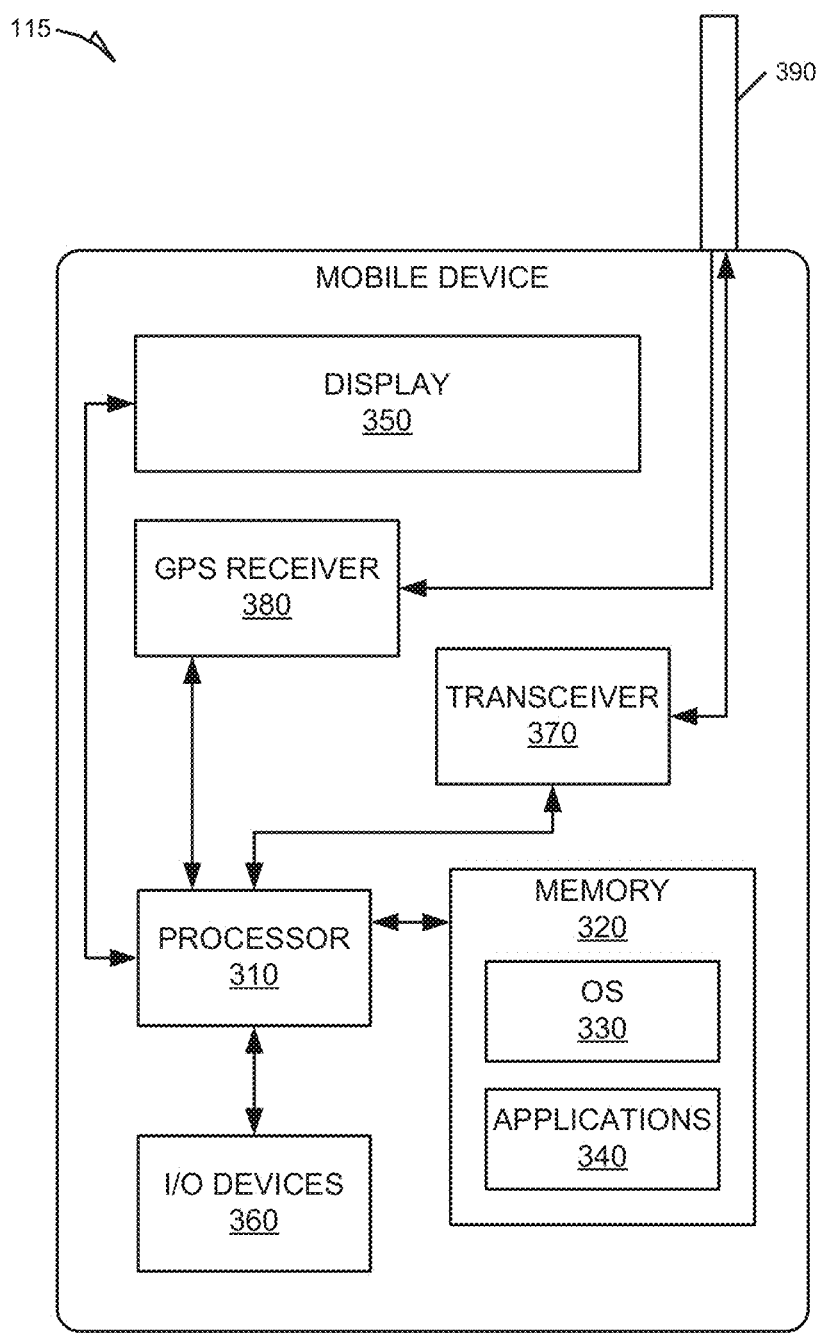
FIG. 3 is a block diagram illustrating a mobile device, according to an example embodiment.

FIG. 3 is a block diagram illustrating a mobile device, according to an example embodiment. The mobile device 115 may include a processor 310. The processor 310 may be any of a variety of different types of commercially available processors suitable for mobile devices (for example, an XScale architecture microprocessor, a Microprocessor without Interlocked Pipeline Stages (MIPS) architecture processor, or another type of processor). A memory 320, such as a Random Access Memory (RAM), a Flash memory, or other type of memory, is typically accessible to the processor. The memory 320 may be adapted to store an operating system (OS) 330, as well as application programs 340, such as a mobile location enabled application that may provide LBSs to a user. The processor 310 may be coupled, either directly or via appropriate intermediary hardware, to a display 350 and to one or more input/output (I/O) devices 360, such as a keypad, a touch panel sensor, a microphone, and the like. Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the mobile device 115. In this manner, the connection 210 with the communication network 220 may be established. Further, in some configurations, a GPS receiver 380 may also make use of the antenna 390 to receive GPS signals.

Example Platform Architecture

Figure 4:
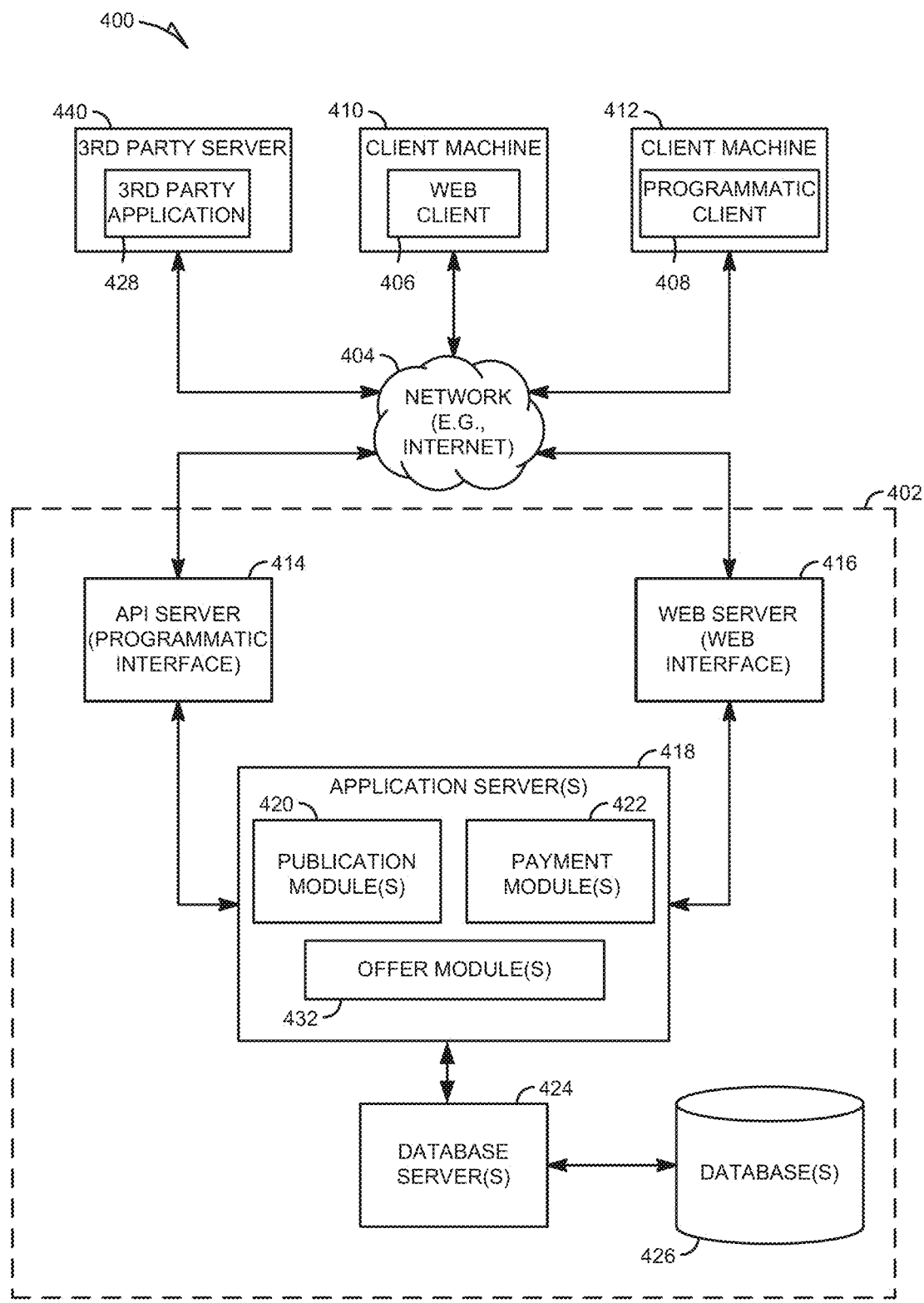
FIG. 4 is a block diagram illustrating a network-based system for delivering check-in and payment services, according to an example embodiment.

FIG. 4 is a block diagram illustrating a network-based system 400 for delivering check-in and payment services, according to an example embodiment. The block diagram depicts a network-based system 400 (in the exemplary form of a client-server system), within which an example embodiment can be deployed is described. A networked system 402, in the example form of a network-based check-in and payment system, that provides server-side functionality, via a network 404 (e.g., the Internet or WAN) to one or more client machines 410, 412. FIG. 4 illustrates, for example, a web client 406 (e.g., a browser, such as the Internet Explorer browser developed by Microsoft Corporation of Redmond, Wash. State) and a programmatic client 408 (e.g., WHERE™ smartphone application from Where, Inc. of Boston, Mass. or FOURSQUARE™ smartphone application from Foursquare, Inc. of New York, N.Y.) executing on respective client machines 410 and 412. In an example, the client machines 410 and 412 can be in the form of a mobile device, such as mobile device 115.

An Application Programming Interface (API) server 414 and a web server 416 are coupled to, and provide programmatic and web interfaces respectively to, one or more application servers 418. The application servers 418 host one or more publication modules 420 (in certain examples, these can also include commerce modules, advertising modules, and marketplace modules, to name a few), payment modules 422, and location-aware offer modules 432. The application servers 418 are, in turn, shown to be coupled to one or more database servers 424 that facilitate access to one or more databases 426. In some examples, the application server 418 can access the databases 426 directly without the need for a database server 424.

The publication modules 420 may provide a number of publication functions and services to users that access the networked system 402. The payment modules 422 may likewise provide a number of payment services and functions to users. The payment modules 422 may allow users to accumulate value (e.g., in a commercial currency, such as the U.S. dollar, or a proprietary currency, such as "points") in accounts, and then later to redeem the accumulated value for products (e.g., goods or services) that are advertised or made available via the various publication modules 420, within retail locations, or within external online retail venues. The payment modules 422 may also be configured to present or facilitate a redemption of offers, generated by the location-aware offer modules 432, to a user during checkout (or prior to checkout, while the user is still actively shopping). The payment modules 422 can also be configured to enable check-in based payment processing. The location-aware offer modules 432 may provide real-time location-aware offers (e.g., coupons or immediate discount deals on targeted products or services) to users of the networked system 402. The location-aware offer modules 432 can be configured to use all of the various communication mechanisms provided by the networked system 402 to present offer options to users. The offer options can be personalized based on current location, time of day, user profile data, past purchase history, or recent physical or online behaviors recorded by the network-based system 400, among other things. While the publication modules 420, payment modules 422, and location-aware offer modules 432 are shown in FIG. 4 to all form part of the networked system 402, it will be appreciated that, in alternative embodiments, the payment modules 422 may form part of a payment service that is separate and distinct from the networked system 402, such as the network-based payment service 140. Additionally, in some examples, the location-aware offer modules 432 may be part of the payment service or may form an offer generation service separate and distinct from the networked system 402. In certain examples, the network-based check-in service 120 can include some or all of the application severs 418.

Further, while the system 400 shown in FIG. 4 employs a client-server architecture, the present invention is of course not limited to such an architecture, and could equally well find application in a distributed, or peer-to-peer, architecture system, for example. The various publication modules 420, payment modules 422, and location-aware offer modules 432 could also be implemented as standalone systems or software programs, which do not necessarily have networking capabilities.

The web client 406 accesses the various publication modules 420, payment modules 422, and location-aware offer modules 432 via the web interface supported by the web server 416. Similarly, the programmatic client 408 accesses the various services and functions provided by the publication modules 420, payment modules 422, and location-aware offer modules 432 via the programmatic interface provided by the API server 414. The programmatic client 408 may, for example, be a smartphone application (e.g., the PAYPAL™ payment application developed by eBay, Inc., of San Jose, Calif.) to enable users to make a various of payments directly from their smartphones.

FIG. 4 also illustrates a third party application 428, executing on a third party server machine 440, as having programmatic access to the networked system 402 via the programmatic interface provided by the API server 414. For example, the third party application 428 may, utilizing information retrieved from the networked system 402, support one or more features or functions on a website hosted by the third party. The third party website may, for example, provide one or more promotional, marketplace or payment functions that are supported by the relevant applications of the networked system 402. Additionally, the third party website may provide merchants with access to the local pricing modules 432 for configuration purposes. In certain examples, merchants can use programmatic interfaces provided by the API server 414 to develop and implement rules-based pricing schemes that can be implemented via the publication modules 420, payment modules 422, and location-aware offer modules 432.

Example Payment Modules

Figure 5:
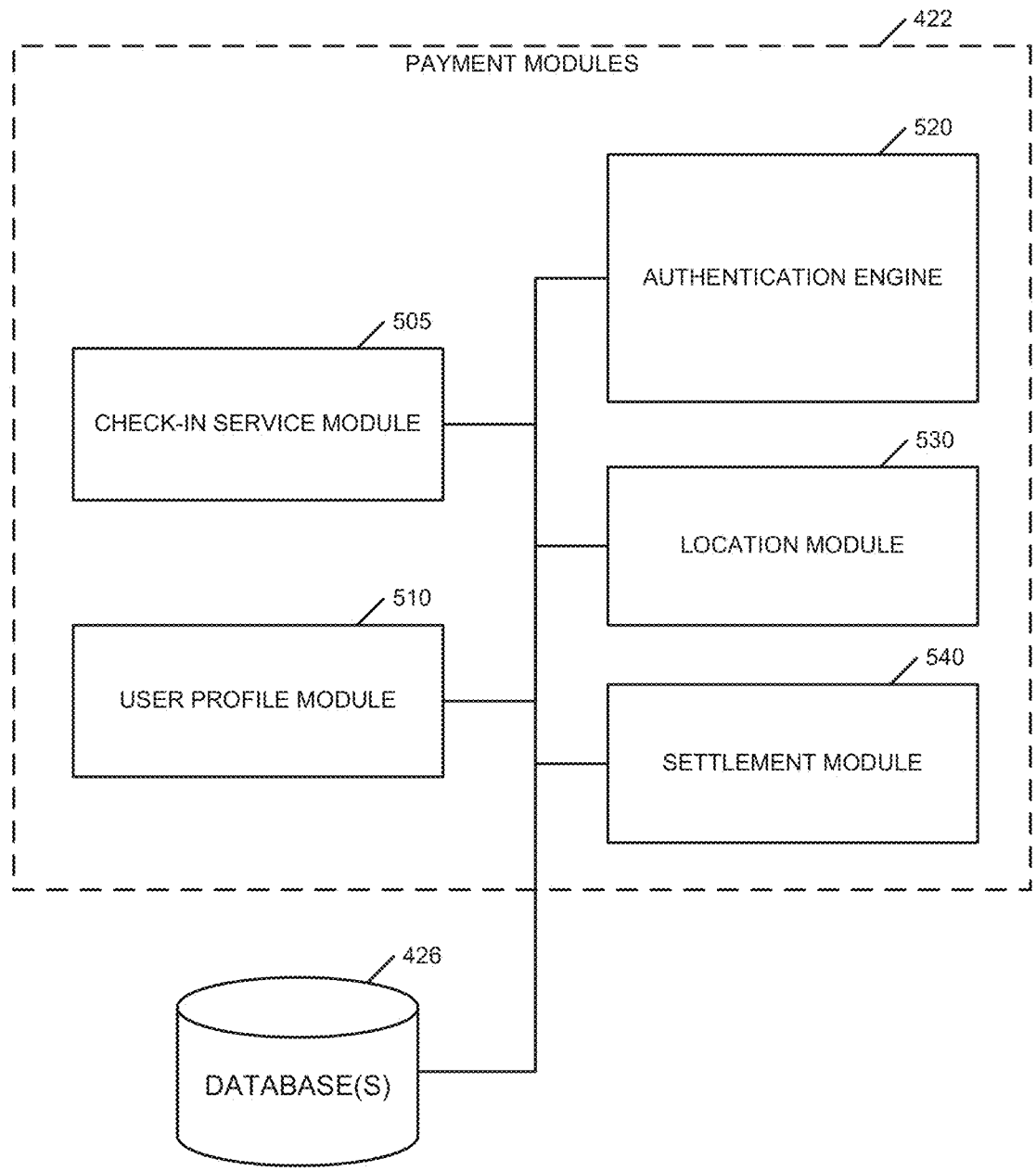
FIG. 5 is a block diagram illustrating payment modules, according to an example embodiment.

FIG. 5 is a block diagram illustrating payment modules, according to an example embodiment. In this example, the payment modules 422 can include a check-in service module 505, a user profile module 510, an authentication engine 520, a location module 530, and a settlement module 540. In an example, the payment modules 422 can access database 426 to store and/or retrieve payment transaction data, user profile data, and location data, as well as other information to enable check-in based payment processing.

The check-in service module 505 can receive and process check-in data from a check-in service, such as the network-based check-in service 120. The user profile module 510 can maintain user account information associated with a user of the networked system 402. The authentication engine 520 can be configured to generate one-time use codes (PINs) that can be used to authenticate payment requests. The authentication engine 520 can also be configured to authenticate logins to the mobile payment application operating on a user's mobile device, such as mobile device 115. The location module 530 can obtain location data from a mobile device or the check-in service module 505 and provide location-based data to other modules and systems. In an example, the location module 530 can work in conjunction with the check-in service module 505 to distribute location-based offers. The settlement module 540 can process transactions to transfer funds between payment accounts and generate transaction receipts.

Additional details regarding the functionality provided by the payment modules 422 are detailed below in reference to FIGS. 6-8.

Example Methods

Figure 6:
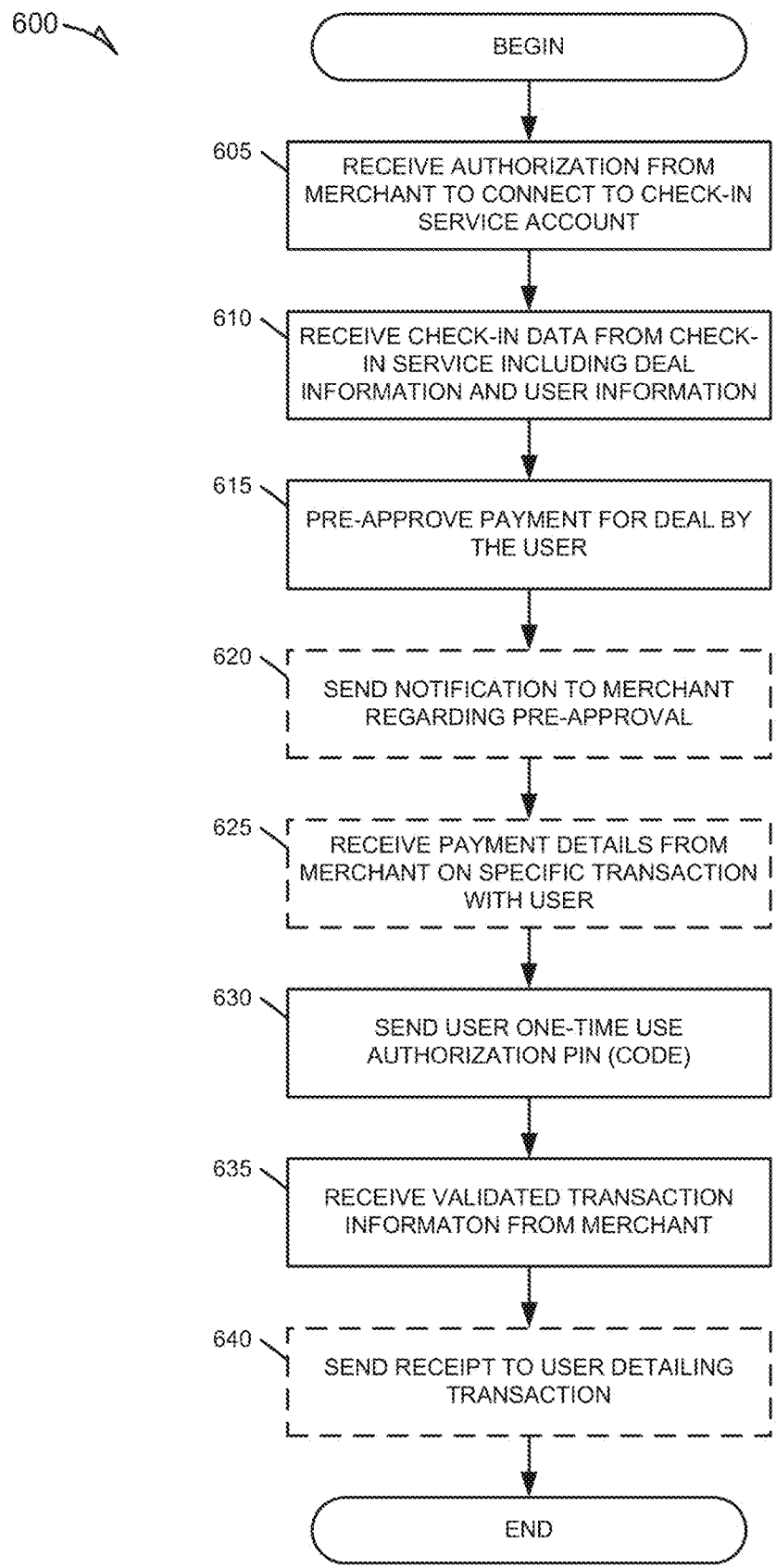
FIG. 6 is a flowchart illustrating a method for a payment service providers to provide check-in based payments, according to an example embodiment.

FIG. 6 is a flowchart illustrating a method 600 for a payment service providers to provide check-in based payments, according to an example embodiment. In an example, the method 600 can include operations for receiving authorization to connect a check-in account with a payment account at 605, receiving check-in data from the check-in service at 610, pre-approving payment for a deal at 615, optionally sending notification to merchant regarding pre-approval at 620, optionally receiving payment details from merchant at 625, sending a user a one-time use authorization PIN (e.g., code) at 630, receiving validated transaction information from the merchant at 635, and optionally sending a receipt to the user detailing the transaction at 640.

In an example, the method 600 can begin at 605 with the payment modules 422 receiving authorization from a merchant to connect the merchant's payment account on the network-based payment service 140 with the merchant's check-in service account on the network-based check-in service 120. In an example, the merchant authorization can include the check-in module 505 setting up the authorized connection. In certain examples, the payment modules 422 can also receive authorization from a user to connect a user's payment account with the user's check-in account (this operation is not explicitly shown in FIG. 6).

At 610, the method 600 can continue with the check-in service module 505 receiving check-in data from the check-in service. In an example, the check-in data can include deals setup for the merchant on the network-based check-in service 120. At 615, the method 600 can continue with the payment modules 422 receiving pre-approval from a user for payment. In an example, the pre-approval can originate from a check-in service, such as the network-based check-in service 120, and is processed by the check-in service module 505. In an example, the pre-approval is specific to a particular deal offered by the merchant over the network-based check-in service 120. In these examples, the pre-approval is generated when the user checks in at one of the merchant's retail locations. Further, the pre-approval can expire within a pre-define timeframe if a related transaction is not completed (as discussed below). In an example, the expiration time for pre-approval can be specified by the user (e.g., set within payment service settings or check-in service settings). The pre-approval can also expire if the check-in service receives notification that the mobile device is no longer within the check-in location (e.g., via a new check-in at a different location). In certain examples, pre-approval can be generated by the authentication engine 520 and can include generation of a one-time use PIN. In these examples, when the check-in module 505 receives check-in data from the check-in service, the authentication engine 520 can be triggered to generate a pre-approval including a one-time use PIN for use with the merchant associated with the check-in.

At 620, the method 600 can optionally continue with the check-in service module 505 sending a notification to the merchant regarding the payment pre-approval or check-in.

In certain examples, the notification to the merchant can include secondary identification, such as a picture, that allows the merchant to engage the user within the retail location. In this example, the notification to the merchant, such as merchant 130, can be processed by the POS system 134. At 625, the method 600 can optionally continue with the settlement module 540 receiving payment details from the merchant regarding a specific transaction with the user. In an example, the transaction details concern a purchase transaction involving the pre-approved deal. In this example, the payment details can be transmitted by the POS system 134.

At 630, the method 600 can continue with the authentication engine 520 generating and sending a one-time use PIN to the user 110 to complete the transaction with the merchant 130. In an example, the authorization engine 520 also sends a secure copy of the PIN to the merchant's POS, such as POS system 134. In this example, the PIN is not revealed to the merchant 130, but the POS system 134 is able to locally validate the PIN when the user 110 submits it to the POS system 134. In an example, the user 110 can type the PIN into the POS system 134, or provide the PIN verbally to the merchant 130 for entry into the POS system 134. In certain examples, the user's mobile device, such as mobile 115, and the merchant's POS, such as POS system 134, can exchange the one-time use PIN via some form of wireless networking (e.g., NFC or IEEE 802.11). In these examples, submitting the PIN to the merchant 130 validates the user's intent to complete the purchase transaction. In yet other examples, the one-time use PIN is validated by the merchant, such as merchant 130, via communication with the payment service, such as payment service 140. PIN validation can be performed in near real-time in a manner similar to credit card validation via the merchant's POS system, such as POS system 134. In certain examples, operation 630 can be performed as part of operation 615 (e.g., as part of generating the pre-approval of payment).

At 635, the method 600 can continue with the authentication engine 520 receiving validated transaction information from the merchant 130. In an example, the authentication engine 520 validates the PIN information provided by the merchant 130 and sends the validated transaction information on to the settlement module 540 for processing. At 640, the method 600 can conclude with the settlement module 540 sending a receipt to the user 110 detailing the transaction. In certain examples, the settlement module 540 can also send a receipt to the merchant 130 as well as transfer funds from the user's account to the merchant's account in accordance with the transaction details.

Figure 7:
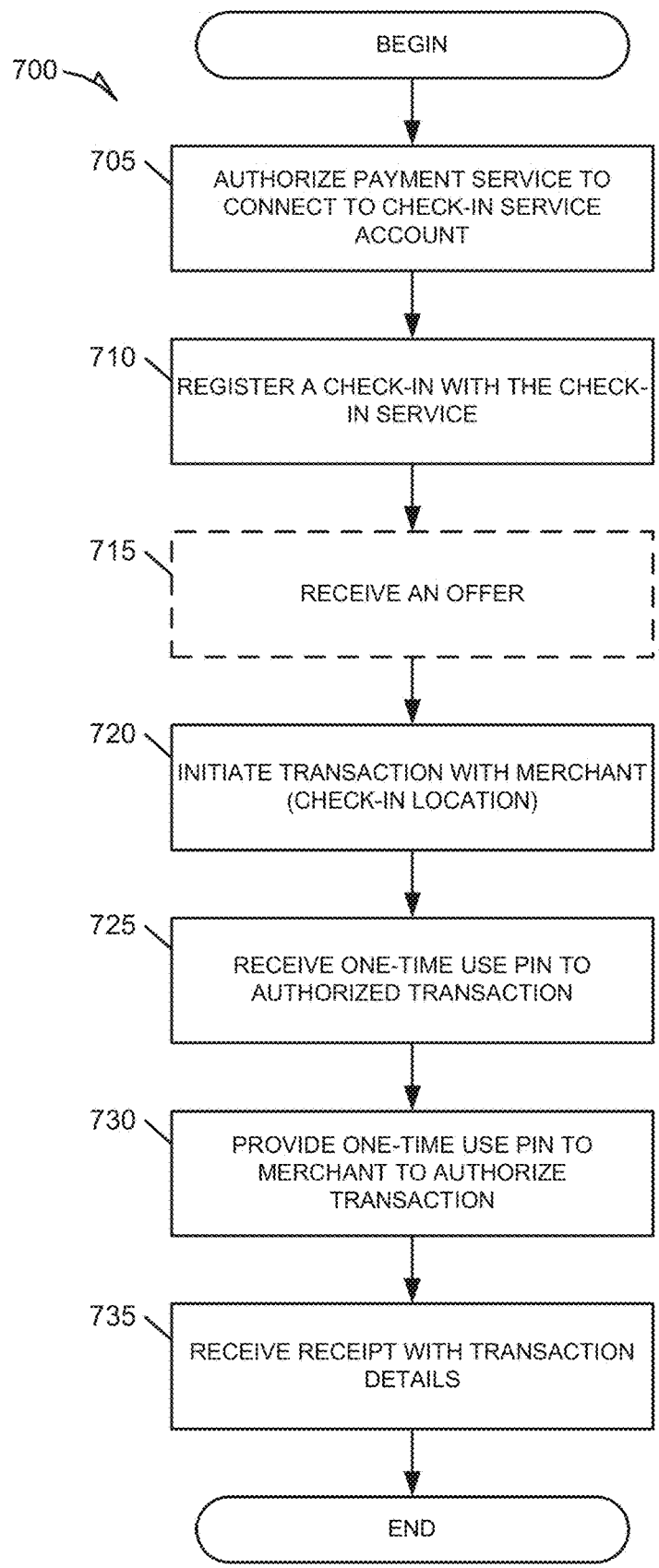
FIG. 7 is a flowchart illustrating a method for a user to make a purchase using check-in based payment processing, according to an example embodiment.

FIG. 7 is a flowchart illustrating a method 700 for a user to make a purchase using check-in based payment processing, according to an example embodiment. In an example, the method 700 includes operations for authorizing a payment service to connect to a check-in service at 705, registering a check-in with the check-in service at 710, optionally receiving an offer at 715, initiating a transaction at 720, receiving a one-time use PIN at 725, providing the PIN to a merchant at 730, and receiving a receipt at 735.

In an example, the method 700 can begin at 705 with the user 110 authorizing a payment service to connect the user's payment service account with a check-in service account. In an example, the user 110 via a mobile device, such as mobile device 115, authorizes the network-based payment service 140 to connect the user's payment account with a check-in account on the network-based check-in service 120. In certain examples, the payment service and check-in service are operated by a single entity, allowing the operation of connecting user accounts to be an internal event. In other examples, the check-in service, such as network-based check-in service 120, can leverage application programming interface (API) access to the network-based payment service 140 to create a new payment account for the user from within the network-based check-in service 120 interface (e.g., browser interface or mobile application interface).

At 710, the method 700 can continue with the user 110 via mobile device 115 registering a check-in with the network-based check-in service 120. At 715, the method 700 can continue with the user's mobile device, mobile device 115, receiving an offer from the network-based check-in service 120. At 720, the method 700 continues with the user 110 initiating a transaction with the merchant 130 at the check-in location. In an example, the transaction is related to the offer received by the user 110. In certain examples, the user 110 initiates the transaction via the mobile device 115. In other examples, the user 110 presents the offer on the mobile device 115 to the merchant 130 to initiate the transaction. In these examples, the POS system 134 can scan a bar code (QR code or similar scanable code) to initiate the transaction. In yet further examples, a mobile application on mobile device 115 can communicate with merchant 130 (e.g., with POS system 134) to present the offer and initiate the transaction.

At 725, the method 700 can continue with the user 110 receiving a one-time use PIN to authorize the transaction. In an example, the one-time use PIN is sent by the network-based payment system 140 to the mobile device 115. At 730, the method 700 continues with the user 110 providing the PIN to the merchant to authorize the transaction. In an example, the PIN can be presented manually, such as by the user entering it into POS system 134. In another example, the PIN can be shared via a wireless network between the mobile device 115 and the POS system 134. Finally, at 735, the method 700 can conclude with the user 110 receiving an electronic receipt for the transaction from the network-based payment system 140. In an example, the user 110 receives the receipt on the mobile device 115.

Figure 8:
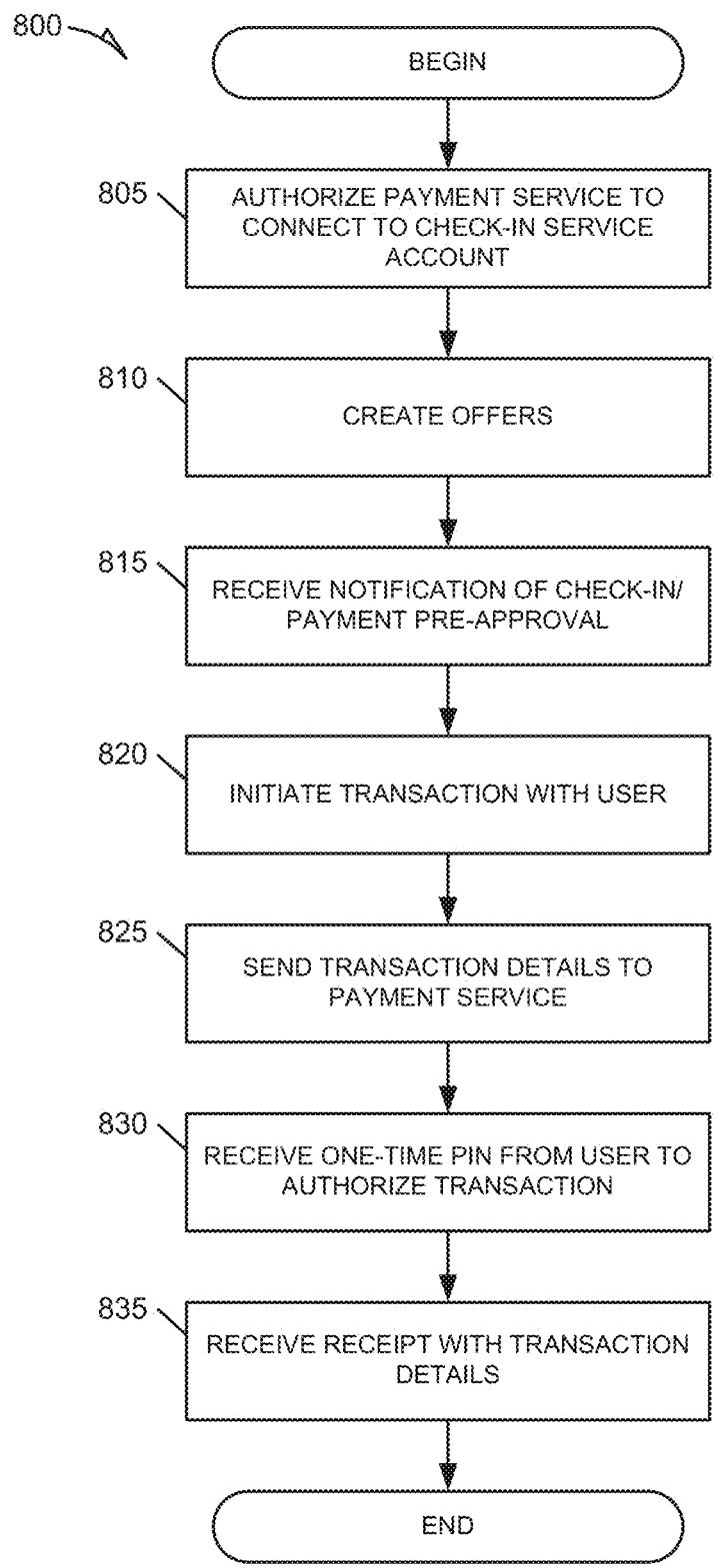
FIG. 8 is a flowchart illustrating a method for a merchant to offer check-in based payment processing, according to an example embodiment.

FIG. 8 is a flowchart illustrating a method 800 for a merchant to offer check-in based payment processing, according to an example embodiment. In an example, the method 800 can include operations such as: authorizing a payment service to connect to a check-in service account at 805, optionally creating offers at 810, receiving notification of check-in and payment pre-approval at 815, initiating a transaction with a user at 820, sending transaction details to a payment service at 825, receiving a one-time use PIN to authorize a transaction at 830, and receiving a receipt detailing the transaction at 835.

At 805, the method 800 can begin with the merchant 130 authorizing a payment service, such as the network-based payment service 140, to connect the merchant's payment account with the merchant's check-in account on a check-in service, such as the network-based check-in service 120. At 810, the method 800 continues with the merchant 130 generating offers that can be delivered by the network-based check-in service 120 when a user registers a check-in at one of the merchant's retail locations.

At 815, the method 800 continues with the merchant 130 receiving notification of a check-in and payment pre-approval. In an example, the check-in notification can be sent by the network-based check-in service 120 to the merchant's POS system 134. In another example, the check-in and the payment pre-approval can be sent by the network-based payment service 140 to the merchant's POS system 134. In certain examples, the merchant 130 can also receive secondary identification information, such as a picture of the user, at the POS system 134. In these examples, the secondary identification information can be used by the merchant 130 to engage the targeted user.

At 820, the method 800 continues with the merchant 130 initiating a transaction with the user. In an example, the user initiates the transaction by presenting an offer code to the merchant's POS system 134. In other examples, the user can initiate a transaction simply by placing an order or selecting an item for purchase. In certain examples, the merchant 130 can provide a mobile shopping application that the user, such as user 110, runs on a mobile device, such as mobile device 115. In these examples, the user 110 can initiate a transaction by selecting a product or service on the mobile device 115. At 825, the method 800 continues with the merchant's POS system 134 sending transaction details to the network-based payment service 140. In certain examples, the network-based payment service 140 sends, in response to the transaction details, information to allow the POS system 134 to locally validate the transaction (e.g., one-time use PIN information). At 830, the method 800 continues with the merchant's POS system 134 receiving the one-time use PIN from the user to authorize the transaction. In an example, the POS system 134 sends the one-time use PIN to the network-based payment system 140 for validation. In another example, the POS system 134 has sufficient information, provided earlier by the network-based payment service 140, to validate the PIN locally. At 835, the method 800 can conclude with the merchant's POS system 134 receiving a transaction settlement receipt from the network-based payment system 140.

Each of FIGS. 6 through 8 illustrates methods for check-in based payment processing, according to various examples. While each method is illustrated as including certain operations in a certain order, these operations and the order of operations are merely exemplary and should not be considered as limiting the subject matter. Other example methods can include fewer or additional operations or similar operations in a different order.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
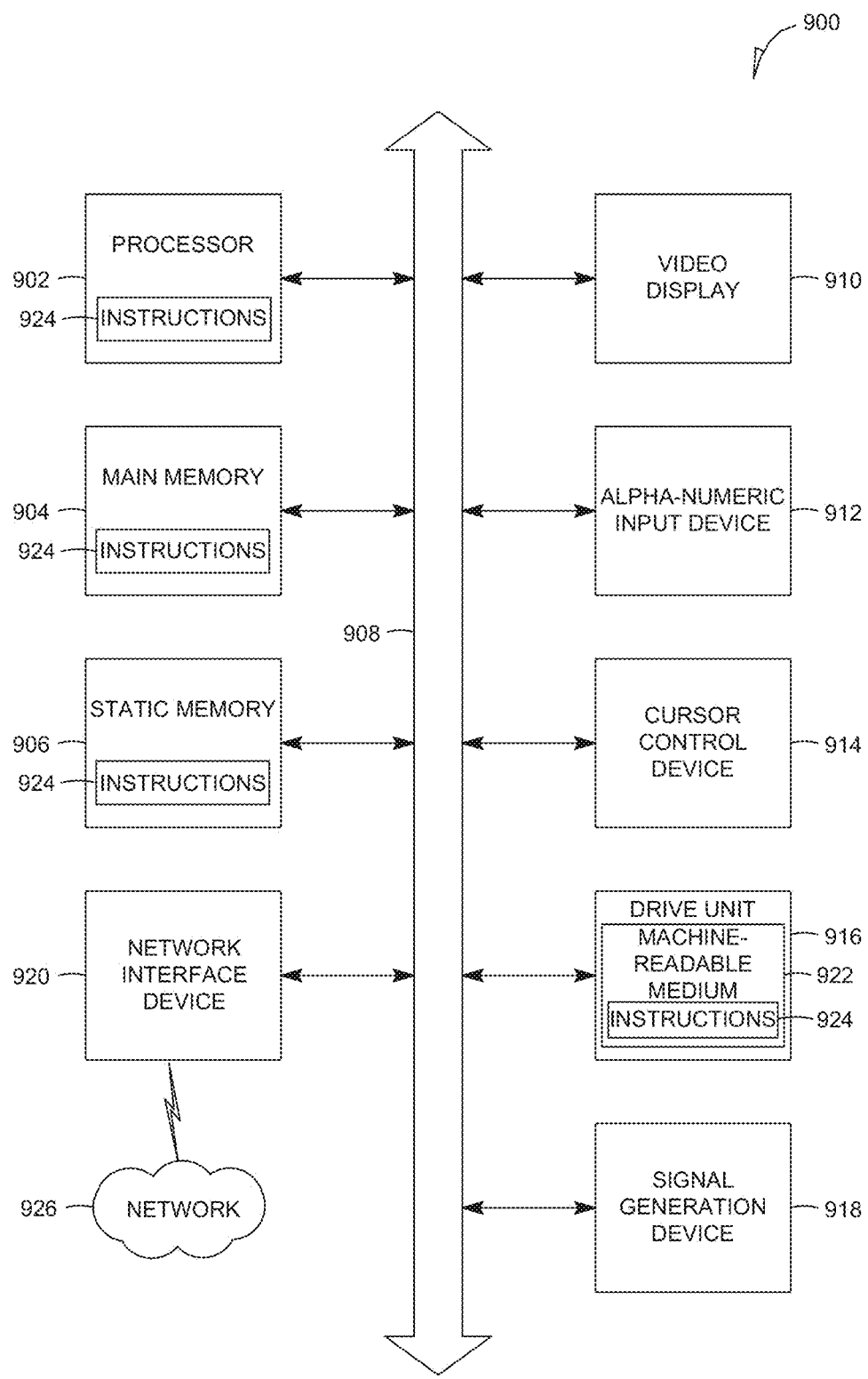
FIG. 9 is a diagrammatic representation of a machine in the example form of a computer system within which a set of instructions for causing the machine to perform any one or more of the methodologies discussed herein may be executed.

FIG. 9 is a block diagram of machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software) 924 embodying or used by any one or more of the methodologies or functions described herein. The instructions 924 may also reside, completely or at least partially, within the main memory 904, static memory 906, and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for making contextual recommendations to users on a network-based marketplace have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The claimed invention includes:
1. A method comprising:
   receiving a first request from a user interface operating on a merchant device to link a first payment account associated with a merchant with a first check-in service account;
   receiving a second request from a user interface operating on a mobile user device to link a second payment account associated with a user with a second check-in service account;
   linking, on a server, the first payment account associated with the merchant with the first check-in service account, the first check-in service account controlled by the merchant, the linking executed in response to the first request received from the merchant;
   linking, on the server, the second payment account associated with the user with the second check-in service account, the second check-in service account controlled by the user, the linking executed in response to the second request received from the user;
   receiving, on the server from a check-in service, check-in data, the check-in data including a merchant identifier and user information identifying the user, registering the user with the second check-in service and associating the user with the mobile user device, and a check-in operation generating the check-in data is initiated by the mobile user device entering a physical location associated with the merchant;
   generating, on the server in response to the check-in operation, a real-time pre-approval for a transaction between the merchant identified by the merchant identifier and the user, the pre-approval including a one-time-use PIN and a termination event associated with the one-time-use PIN;
   sending, from the server to the mobile user device over a network, at least the one-time-use PIN;
   receiving, on the server from the user interface operating on the merchant device over the network, a validated transaction, the validated transaction including the one-time-use PIN associated with the pre-approval; and
   processing, on the server, a payment from the second payment account to the first payment account based at least in part on the validated transaction.

2. The method of claim 1 further comprising receiving, from the merchant over the network, transaction information detailing a pending transaction between the merchant and the user, the transaction information including the one-time-use PIN.

3. The method of claim 2 further comprising validating the pending transaction at least in part by verifying that the one-time-use PIN received from the merchant matches the one-time-use PIN generated as part of the pre-approval.

4. The method of claim 2, wherein the validating the pending transaction includes decrypting the one-time-use PIN received from the merchant.

5. The method of claim 1, wherein the generating the pre-approval includes setting an expiration period for the one-time-use PIN.

6. The method of claim 1, wherein the termination event includes a subsequent check-in associated with the user at a different physical location as the termination event for the one-time-use PIN.

7. The method of claim 1, wherein the sending the one-time-use PIN includes sending the one-time-use PIN in a text message to the mobile user device.

8. The method of claim 1 further comprising sending, to the merchant over a network, the check-in data including a secondary user identifier to assist the merchant in interacting with the user.

9. The method of claim 8, wherein the sending the check-in data includes sending a picture of the user as the secondary user identifier.

10. A system comprising:
    processors;
    a memory storing instructions that, when executed by at least one processor among the processors, causes the system to perform operations comprising:
        receiving a first request from a user interface operating on a merchant device to link a first payment account associated with a merchant with a first check-in service account;
        receiving a second request from a user interface operating on a mobile user device to link a second payment account associated with a user with a second check-in service account;
        linking, on a server, the first payment account associated with the merchant with the first check-in service account, the first check-in service account controlled by the merchant, the linking executed in response to the first request received from the merchant;
        linking, on the server, the second payment account associated with the user with the second check-in service account, the second check-in service account controlled by the user, the linking executed in response to the second request received from the user;
        receiving, from a check-in service, check-in data, the check-in data including a merchant identifier and user information identifying the user, registering the user with the second check-in service and associating the user with the mobile user device, and a check-in operation generating the check-in data is initiated by the mobile user device entering a physical location associated with the merchant;
        generating in response to the check-in operation a real-time pre-approval for a transaction between a merchant identified by the merchant identifier and the user, the pre-approval including a one-time-use PIN and a termination event associated with the one-time-use PIN;
        sending, to the mobile user device over a network, at least the one-time-use PIN;
        receiving, from the user interface operating on the merchant device over the network, a validated transaction, the validated transaction including the one-time-use PIN associated with the pre-approval; and
        processing a payment from the second payment account to the first payment account based at least in part on the validated transaction.

11. The system of claim 10, wherein the instructions cause the system to perform operations further comprising:
    receiving, from the merchant over the network, transaction information detailing a pending transaction between the merchant and the user, the transaction information including the one-time-use PIN.

12. The system of claim 11, wherein the instructions cause the system to perform operations further comprising:
    validating the pending transaction at least in part by verifying that the one-time-use PIN received from the merchant matches the one-time-use PIN generated as part of the pre-approval.

13. The system of claim 12, wherein the instructions cause the system to perform operations further comprising:
    validating the pending transaction at least in part by decrypting the one-time-use PIN received from the merchant.

14. The system of claim 11, wherein the instructions cause the system to perform operations further comprising:
    determining whether the termination event has been satisfied during validation of the pending transaction.

15. A non-transitory machine-readable storage medium including instructions that, when executed by a machine, cause the machine to perform operations comprising:
    receiving a first request from a user interface operating on a merchant device to link a first payment account associated with a merchant with a first check-in service account;
    receiving a second request from a user interface operating on a mobile user device to link a second payment account associated with a user with a second check-in service account
    linking, on a server, the first payment account associated with the merchant with the first check-in service account, the first check-in service account controlled by the merchant, the linking executed in response to the first request received from the merchant;
    linking, on the server, the second payment account associated with the user with the second check-in service account, the second check-in service account controlled by the user, the linking executed in response to the second request received from the user;
    receiving, from the check-in service, check-in data, the check-in data including a merchant identifier and user information identifying the user, registering the user with the second check-in service and associating the user with the mobile user device, and a check-in operation generating the check-in data is initiated by the mobile user device entering a physical location associated with the merchant;
    generating in response to the check-in operation a real-time pre-approval for a transaction between a merchant identified by the merchant identifier and the user, the pre-approval including a one-time-use PIN, and a termination event associated with the one-time-use PIN;
    sending, from the server to the mobile user device over a network, at least the one-time-use PIN;
    receiving, on the server from the user interface operating on the merchant device over the network, a validated transaction, the validated transaction including the one-time-use PIN associated with the pre-approval; and processing a payment from second payment account associated with the user to the first payment account associated with the merchant based at least in part on the validated transaction.

16. The non-transitory machine-readable storage medium of claim 15, wherein the operations further comprise receiving, from the merchant over the network, transaction information detailing a pending transaction between the merchant and the user, the transaction information including the one-time-use PIN.

17. The non-transitory machine-readable storage medium of claim 16, wherein the operations further comprise validating the pending transaction at least in part by verifying that the one-time-use PIN received from the merchant matches the one-time-use PIN generated as part of the pre-approval.

18. The non-transitory machine-readable storage medium of claim 17, wherein the validating further comprises decrypting the one-time-use PIN received from the merchant.

* * * * *